United States Patent [19]

Gaylord

[11] Patent Number: 4,543,401

[45] Date of Patent: * Sep. 24, 1985

[54] PEROXYGEN COMPOUND-ISOASCORBIC ACID REDOX CATALYST SYSTEM FOR SUSPENSION POLYMERIZATION OF VINYL CHLORIDE

[75] Inventor: Norman G. Gaylord, New Providence, N.J.

[73] Assignee: Plastic Specialties and Technologies, Inc., Barrington, Ill.

[*] Notice: The portion of the term of this patent subsequent to May 3, 2000 has been disclaimed.

[21] Appl. No.: 260,658

[22] Filed: May 4, 1981

[51] Int. Cl.$^4$ .................................................. C08F 4/40
[52] U.S. Cl. ..................................... 526/204; 526/213; 526/216; 526/230.5

[58] Field of Search ............... 526/204, 213, 210, 216, 526/228

[56] References Cited

U.S. PATENT DOCUMENTS 3,501,440 3/1970 Kamio .................................. 526/212
3,560,454 2/1971 Büning .................................. 526/212

*Primary Examiner*—Christopher A. Henderson
*Attorney, Agent, or Firm*—Wood, Herron & Evans

[57] ABSTRACT

A process for the suspension polymerization of vinyl chloride, in the presence of a redox catalyst system consisting of a peroxyester or diacyl peroxide and isoascorbic acid.

1 Claim, No Drawings

PEROXYGEN COMPOUND-ISOASCORBIC ACID REDOX CATALYST SYSTEM FOR SUSPENSION POLYMERIZATION OF VINYL CHLORIDE

FIELD OF THE INVENTION

This invention relates to a process for the suspension polymerization of vinyl chloride, using a redox catalyst system consisting of a peroxyester or a diacyl peroxide and isoascorbic acid.

BACKGROUND OF THE INVENTION

The suspension polymerization of vinyl chloride is generally carried out at temperatures below 70° C. using organic soluble initiators. Although lauroyl peroxide was earlier the most widely used catalyst, in recent years other low temperature catalysts including azobisisobutyronitrile, diisopropyl peroxydicarbonate, t-butyl peroxypivalate and mixtures thereof, have been adopted. These and other catalysts are described in Pennwalt Corporation, Lucidol Division, Technical Bulletin 30.90, "Free Radical Initiators for the Suspension Polymerization of Vinyl Chloride" (1977).

The choice of initiator is dictated by its half-life and by its influence on the polymerization process and the properties of the poly(vinyl chloride) produced thereby.

The polymerization of vinyl chloride is characterized by a short induction period, followed by a gradually increasing rate of polymerization. During the earlier stages of the polymerization, the reaction rate is lower than the maximum so that the capacity of the reactor is not fully utilized. Peroxyesters reduce the induction period and, due to a more constant rate of polymerization, increase reactor productivity. Further, peroxyesters can generally be used at levels below that needed for peroxides and give much less chain branching during polymerization.

Although peroxyesters such as diisopropyl peroxydicarbonate and t-butyl peroxypivalate offer numerous advantages in vinyl chloride polymerization, their disadvantages include the necessity for low temperature shipping and storage and decreased efficiency at elevated temperatures.

The use of peroxyesters having higher decomposition temperatures is not feasible in present poly(vinyl chloride) production facilities due to the higher monomer pressures involved and the low molecular weight and poorer stability of the resultant resins. Nevertheless, the handling advantages of such peroxyesters makes their use extremely attractive.

The use of higher temperature catalysts at lower temperatures is a common practice in polymer technology. Thus, redox systems such as ammonium persulfate—sodium metabisulfite and hydrogen peroxide—ferrous sulfate are used in emulsion polymerization while benzoyl peroxide—dimethylaniline and methyl ethyl ketone peroxide—cobalt naphthenate are used in styrene—unsaturated polyester polymerization.

Reducing agents used in conjunction with monomer-soluble peroxyesters in the polymerization of vinyl chloride include potassium metabisulfite (N. Fischer and C. Lambling, French Pat. No. 2,086,635 (1972), sodium bisulfite (H. Minato, K. Hashimoto, and T. Yasui, Japan. Pat. No. 68 20,300 (1968), sodium bisulfite—cupric chloride (B. K. Shen, U.S. Pat. No. 3,668,194 (1972), sodium dithionite—ferrous sulfate (H. Minato, Japan. Pat. No. 70 04,994 (1970) and trialkyl boron (R. Kato and I. Soematsu, Japan. Pat. No. 5498('65) (1965); A. V. Ryabov, V. A. Dodonov, and Y. A. Ivanova, Tr. Khim. Khim. Tekknol., 1970, 238; Stockholms Superfosfat Fabriks A/B, Brit. Pat. No. 961,254 (1964).

Reducing agents used in conjunction with monomer-soluble diacyl peroxides in the polymerization of vinyl chloride include ferrous sulfate-sodium hydroxide (A. M. Sharetskii, S. V. Svetozarskii, E. N. Zil'berman, and I. B. Kotlyar, Brit. Pat. No. 1,164,250 (1969) and U.S. Pat. No. 3,594,359 (1971), ferrous caproate (J. Ulbricht and N. V. Thanh, Plaste Kaut., 21, 186 (1974); J. Ulbricht and G. Mueller, Plaste Kaut., 21, 410 (1974) and trialkyl boron (A. V. Ryabov, V. A. Dodonov, and Y. A. Ivanova, Tr. Khim. Khim. Tekknol., 1970, 238).

Various stannous compounds have been disclosed as reducing agents in the suspension polymerization of vinyl chloride in the presence of peroxyesters and diacyl peroxides in our copending applications. Thus, stannous carboxylates are disclosed in application Ser. No. 106,332, filed Dec. 21, 1979, now U.S. Pat. No. 4,269,957; stannous carboxylate-complexing agent combinations are disclosed in application Ser. No. 106,325, filed Dec. 21, 1979, now U.S. Pat. No. 4,269,956; stannous mercaptides are disclosed in application Ser. No. 106,331, now U.S. Pat. No. 4,242,482 (1980); stannous chloride has been disclosed in application Ser. No. 106,333, filed Dec. 21, 1979, now U.S. Pat. No. 4,269,958.

Monosaccharides and monosaccharide carboxylic acid esters have been disclosed as reducing agents in the suspension polymerization of vinyl chloride in the presence of peroxyesters in our U.S. Pat. No. 4,261,870 (1981).

Ascorbic acid has been used as the sole reducing agent or in combination with cupric, ferrous or ferric salts, in the polymerization of vinyl chloride in the presence of water-soluble catalysts including hydrogen peroxide (H. I. Roll, J. Wergau and W. Dockhorn, Ger. Offen. Pat. No. 2,208,442 (1973); J. A. Cornell, U.S. Pat. No. 3,534,010 (1970); K. Okamura, K. Suzuki, Y. Nojima and H. Tanaka, Japan. Pat. No. 18,954('64)(1964); H. Watanabe, S. Yamanaka and Y. Amagi, Japan. Pat. No. 16,591('60) (1960), potassium persulfate (K. H. Prell, E. Plaschil and H. Germanus, East Ger. Pat. No. 75,395 (1970), cumene hydroperoxide (R. J. S. Matthews, Brit. Pat. No. 931,628 (1963), acetyl cyclohexanesulfonyl peroxide (Dynamit Nobel A.G., Netherlands Appl. No. 6,408,790 (1965), and a mixture of hydrogen peroxide and acetyl cyclohexanesulfonyl peroxide (R. Buning, K. H. Diessel and G. Bier, Brit. Pat. No. 1,180,363 (1970).

Ascorbic acid has been disclosed as a complexing agent in the polymerization of vinyl chloride in the presence of a diacyl peroxide and various water-soluble metal salts (N. Fischer, J. Boissel, T. Kemp and H. Eyer, U.S. Pat. No. 4,091,197 (1978). The complexing agent "causes the metal to change from its water-soluble form to an organo-soluble form" so that it can function as an "activator" for the organo-soluble initiator. There is no teaching that water-soluble ascorbic acid is capable of acting as a reducing agent for the water-insoluble initiator in the absence of the metal salts.

Isoascorbic acid, also known as erythorbic acid, D-ascorbic acid and D-araboascorbic acid, as well as ascorbic acid are disclosed as reducing agents in combination with the salts of heavy metals such as iron, copper, tin, silver and cerium, in the polymerization of vinyl chloride in alcohol solution, in the presence of various peroxygen compounds (Kureha Chemical Industry Co., Ltd., Japan. Pat. No. 7493('60) (1960). Similarly, isoascorbic acid and ascorbic acid are jointly disclosed as components of catalyst systems containing peroxides and either heavy metal salts or metal chelates, for the emulsion polymerization of vinyl bromide in water or aqueous alcohol (I. Shinohara and J. Aoyagi, Japan. Kokai 73 102,887 (1973); E. Tsuchida, Japan, Kokai 73 20,884 (1973).

The use of an alcoholic medium permits the homogeneous polymerization of vinyl acetate in the presence of t-butyl perbenzoate with isoascorbic acid or ascorbic acid as part of a redox catalyst system (Japan Synthetic Chemical Industry Co., Ltd., Japan. Pat. No. 10,593('62) (1962).

The prior art cited hereinabove discloses the use of water-soluble ascorbic acid as either the sole reducing agent or in combination with water-soluble metal compounds, in the emulsion polymerization of vinyl chloride, generally in the presence of a water-soluble peroxygen compound. It further discloses that either water-soluble ascorbic acid or water-soluble isoascorbic acid may be used in the polymerization of vinyl chloride, vinyl bromide or vinyl acetate in the presence of a peroxygen compound in water or aqueous alcohol. There is no disclosure of the use of ascorbic acid or, more particularly, isoascorbic acid, as the sole reducing agent, in the absence of alcohol and/or metal salts, in the suspension polymerization of vinyl chloride in the presence of water-insoluble peroxygen compounds.

SUMMARY OF THE INVENTION

An object of the present invention is to provide a process for the polymerization of vinyl chloride, in the presence of peroxygen compounds at temperatures at which the latter are stable and readily handled. Another object of the present invention is to provide a process for the suspension polymerization of vinyl chloride at temperatures below 70° C. using peroxygen compounds which, at these temperatures, do not generate free radicals at a sufficient rate to initiate polymerization at a practical rate, if at all.

It has now been found that this improvement in vinyl chloride polymerization can be achieved, to an extent, by utilizating a redox catalyst system consisting of a peroxyester or a diacyl peroxide and L-ascorbic acid, commonly known as ascorbic acid, as sole reducing agent. However, the present invention involves the totally unexpected finding that the optical isomer D-ascorbic acid, commonly known as isoascorbic acid, is significantly more effective as the sole reducing agent in the suspension polymerization of vinyl chloride in the presence of the monomer-soluble peroxygen compounds.

DETAILED DESCRIPTION OF THE INVENTION

According to the present invention, the polymerization of vinyl chloride is carried out in suspension, under the conditions applicable thereto and well known to those skilled in the art, using a catalyst system consisting of a monomer-soluble peroxyester or diacyl peroxide and a reducing agent which is isoascorbic acid.

The half-life of a free radical catalyst is the time required for 50% decomposition at a particular temperature. The half-life is only relevant as regards the temperature at which it is desired to conduct a polymerization, e.g. the polymerization of vinyl chloride below 70° C. to produce poly(vinyl chloride) with greater thermal stability than polymer produced above 70° C. The half-life of a peroxyester refers to thermal decomposition and, consequently, if a polymerization is to be conducted at 50° C., a catalyst with a half-life of 20 hours or less at 50° C., can be used for the polymerization, e.g. t-butyl peroxypivalate or t-butyl peroxyneodecanoate, as is well known to those skilled in the art.

However, if it is desired to conduct the polymerization with a catalyst which does not require refrigerated shipment and/or storage, which are required by t-butyl peroxypivalate and t-butyl peroxyneodecanoate, than in accordance with the present invention, a catalyst with a half-life of more than 50 hours at 50° C. can be used in the presence of a suitable reducing agent, e.g. t-butyl peroxyoctoate which has a half-life of 133 hours at 50° C. in the absence of the reducing agent may be used.

Alternatively, if it is desired to conduct polymerization at or below 25° C., in order to maintain better control of the reaction exotherm or to obtain a higher molecular weight, less branched polymer, the aforementioned peresters, despite the requirement for refrigerated shipping and storage, having half-lives of more than 150 hours at 25° C., may be used in the presence of a suitable reducing agent.

The process of the present invention utilizes a peroxygen compound such as a peroxyester and a diacyl peroxide, in the presence of a suitable reducing agent, at a temperature where the peroxygen compound has a half-life of more than 50 hours in the absence of the reducing agent.

The peroxyesters which may be used in the process of the present invention are the alkyl and aralkyl peroxyesters of aliphatic or aromatic carboxylic acids or carbonic acid and may be represented by the structural formula

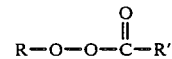

where R is an alkyl, aralkyl or alkoxycarbonyl group, R' is an alkyl, aralkyl, aryl or alkoxy group, and R and R' are the same or different. When R and/or R' contain alkyl or aralkyl moieties, the latter may contain 1–20 carbon atoms and may be primary, secondary or tertiary, linear or branched, acyclic or cyclic, saturated or unsaturated and may contain non-hydrocarbon substituents including halogen and hydroxyl groups. When R' is an aromatic moiety, it may be unsubstituted or may contain hydrocarbon, halogen and/or other substituents.

The peroxyesters may be monoperoxyesters or the diperoxyesters of dicarboxylic acids or diols.

Representative peroxyesters include t-butyl peroxyacetate, t-butyl peroxyisobutyrate, t-butyl peroxypivalate, t-butyl peroxyneodecanoate, t-butyl peroxybenzoate, t-butyl peroxyoctoate, t-butyl peroxy(2-ethylhexanoate), t-amyl peroxyneodecanoate, cumyl neodecanoate, isobutyl peroxypivalate, sec-butyl peroxybenzoate, n-butyl peroxyoctoate, t-butyl peroxy-3,3,5-trimethylhexanoate, t-butyl peroxy-2-methylbenzoate, 2,5-dimethyl-2,5-bis(2-ethylhexanoylperoxy)hexane, 2,5-dimethyl-2,5-bis(benzoylperoxy)hexane, 2,5-dimethyl-2,5-bis(octanoylperoxy)-hexane, di-t-butyl diperoxyphthalate, t-butyl peroxymaleic acid, t-butyl peroxyisopropylcarbonate, di(sec-butyl)peroxydicarbonate, bis(4-t-butylcyclohexyl)peroxydicarbonate, diisopropyl peroxydicarbonate, di(n-propyl)peroxydicarbonate, di(2-ethylhexyl)peroxydicarbonate, dicyclohexyl peroxydicarbonate, dicetyl peroxydicarbonate and the like.

Aliphatic diacyl peroxides including acetyl peroxide, lauroyl peroxide, decanoyl peroxide and isononanoyl peroxide, as well as aromatic diacyl peroxides including benzoyl peroxide, p-chlorobenzoyl peroxide and 2,4-dichlorobenzoyl peroxide may be used in conjunction with the reductants of the present invention at a temperature where the diacyl peroxide has a half-life of more than 50 hours in the absence of the reductant.

The process of the present invention is carried out with a redox catalyst system consisting of a monomer-soluble peroxygen compound and a monomer-insoluble reductant, isoascorbic acid.

The peroxygen compound/reductant mole ratio is generally 1/0.01-2, with a preferred mole ratio of 1/0.1-1. The addition of the peroxygen compound and the reductant to the reaction mixture may be made in any order, with the total amount of either or both being added initially or intermittently as the reaction proceeds.

The concentration of peroxygen compound is generally 0.01-5% by weight of the vinyl monomer, with a preferred concentration of 0.05-1% by weight.

The procedures normally used in the suspension polymerization of vinyl chloride are applicable to the process of the present invention. Typical procedures are described in Encyclopedia of Polymer Science and Technology, 14, 339-343 (1971), the disclosure of which is incorporated herein by reference.

The polymerization may be conducted at or above atmospheric pressure. In the usual procedure, the reactor is charged at atmospheric pressure and the pressure rises when the contents of the reactor are brought to reaction temperature. The pressure may increase further due to the reaction exotherm and then remain constant until the conversion reaches about 70%, after which it decreases rapidly as the reaction continues.

The polymerization temperature may range from −50° to +70° C. for bulk polymerization, although temperatures of 40° to 60° C. are preferred. Suspension polymerization may be carried out at temperatures of +5° to +70° C. although preferred temperatures are in the 20°-60° C. range.

The concentrations of monomer and water, e.g. about 2/1 weight ratio, and the types and concentrations of suspending agents are those normally used in suspension polymerization and are well known to those skilled in the art. Typical suspending agents include poly(vinyl alcohol), partially saponified poly(vinyl acetate), gelatin, methylcellulose, vinyl acetate-maleic anhydride copolymer and the like. Various emulsifiers such as sulfonated oils and ethylene oxide condensation products may be added to control surface tension and particle shape. Buffers may be used, where necessary, e.g. when gelatin is used as suspending agent. Chain transfer agents such as chlorinated hydrocarbons and isobutylene may be used in the preparation of low molecular weight polymer.

Although the peroxygen compound-isoascorbic acid redox catalyst system of the present invention is particularly useful in the suspension polymerization of vinyl chloride, the redox system may also be used in the copolymerization of vinyl chloride with vinylidene chloride, vinyl acetate and other monomers which undergo copolymerization with vinyl chloride.

As indicated earlier, in our copending applications, the suspension polymerization of vinyl chloride with monomer-soluble peroxygen compounds was carried out with the use of monomer-soluble reducing agents, e.g. stannous and antimony carboxylates and mercaptides. The use of water-soluble, monomer-insoluble reducing agents, in the absence of metal compounds, was considered potentially less effective due to the separation of the components of the redox catalyst system. This was confirmed by the low conversions disclosed in our U.S. Pat. No. 4,261,870 (1981), wherein the use of water-soluble monosaccharides such as glucose, as reductants, in the absence of metal compounds, with 0.5% monomer-soluble t-butyl peroxyoctoate, gave conversions of no more than 40% after 7 hours at 50° C.

Subsequently, it was found, as disclosed in our copending application Ser. No. 106,330, filed Dec. 21, 1979, now U.S. Pat. No. 4,269,960, that the use of water-insoluble 6-O-alkanoyl-L-ascorbic acid resulted in conversions of about 80% after 7 hours at 50° C., when used with 0.5% t-butylperoxyoctoate.

The use of high concentrations of peroxygen compound is undesirable since the presence of residual peroxide, having a long half-life under ambient conditions, results in a decrease in the stability of the poly(vinyl chloride) during processing.

A reexamination of the ascorbic acid-peroxyester redox system in the suspension polymerization of vinyl chloride, revealed that, whereas water-soluble ascorbic acid gave the expected low conversions at lower concentrations of peroxygen compound, water-soluble isoascorbic acid unexpectedly gave significantly higher conversions at the same concentration of peroxygen compound and was even effective at much lower initiator concentration.

A comparison of the results obtained with ascorbic acid and isoascorbic acid, in the suspension polymerization of vinyl chloride at 50° C., in the presence of t-butyl peroxyoctoate (tBPO) at a peroxyester/reductant mole ratio of 2/1, is set forth in Table 1.

TABLE 1

| Reductant | tBPO, wt % | Time, hrs | Conversion, % |
|---|---|---|---|
| Ascorbic acid | 0.3 | 8.5 | 40.5 |
|  | 0.1 | 8.5 | 20.0 |
| Isoascorbic acid | 0.1 | 8.5 | 70.5 |
|  | 0.1 | 16.0 | 70.5 |
|  | 0.05 | 16.0 | 40.0 |

The results obtained with 0.1% tBPO indicate that isoascorbic acid gave a 350% higher conversion than the same amount of ascorbic acid. The polymerization was apparently complete within the 8.5 hour reaction period, since a 16 hour reaction gave the same conversion. This is consistent with commercial practice wherein the pressure due to vinyl chloride monomer drops after 7-8 hours at 50° C. and the reaction is terminated at about 70-80% conversion due to insufficient pressure to maintain monomer in the suspension system. Even 0.05% tBPO gives significant polymerization in the presence of isoascorbic acid.

The following examples, which give the details of the experiments summarized in Table 1, are illustrative embodiments of the practice of the present invention and are not to be construed as limitations on the invention or the claims. Numerous modifications will be obvious to those skilled in the art.

EXAMPLE I

A 6 oz glass bottle was charged with the following suspension recipe:
- 42 ml distilled water (boiled)
- 2 ml 1% aqueous solution of Tween 60 (polyoxyethylene sorbitan monostearate, Atlas Chemical Industries Inc.)
- 2 ml 1% aqueous solution of Span 60 (sorbitan monostearate, Atlas Chemical Industries Inc.)
- 4 ml 1% aqueous solution of Methocel A-15 (methylcellulose with viscosity of 15 cps as a 2% aqueous solution, Dow Chemical Co.)

Nitrogen was bubbled through the aqueous solution for 15 minutes.

Gaseous vinyl chloride was purified by passage through two 5% aqueous sodium hydroxide solutions, dried by passage through a silica gel column and condensed with the aid of a dry ice bath. After 0.004 g (0.023 mmole) isoascorbic acid and 20 g vinyl chloride were added to the suspension recipe, the bottle was closed with a screw cap containing a center hole and a self-sealing gasket. The addition of 0.011 ml (0.046 mmole) t-butyl peroxyoctoate (0.05% by weight of vinyl chloride) was made by injection through the gasket using a hypodermic syringe. The bottle was placed in a 50° C. constant temperature bath and shaken for 16 hours. The residual monomer was released and an 8.0 g yield (40.0% conversion) of poly(vinyl chloride) beads was isolated.

EXAMPLE II

The procedure of Example I was repeated, using a 6 oz glass bottle with the same suspension recipe, with 20 g vinyl chloride, 0.008 g (0.046 mmole) isoascorbic acid and 0.022 ml (0.092 mmole) t-butyl peroxyoctoate (0.1% by weight of vinyl chloride). After 16 hours at 50° C., the yield was 14.1 g (70.5% conversion).

EXAMPLE III

The procedure of Example I was repeated, using a 6 oz glass bottle with the same suspension recipe, with 20 g vinyl chloride, 0.008 g (0.046 mmole) isoascorbic acid and 0.022 ml (0.092 mmole) t-butyl peroxyoctoate (0.1% by weight of vinyl chloride). After 8.5 hours at 50° C., the yield was 14.1 g (70.5% conversion).

EXAMPLE IV

The procedure of Example I was repeated, using a 6 oz glass bottle with the same suspension recipe, with 20 g vinyl chloride, 0.008 g (0.046 mmole) ascorbic acid and 0.022 ml (0.092 mmole) t-butyl peroxyoctoate (0.1% by weight of vinyl chloride). After 8.5 hours at 50° C., the yield was 4.0 g (20.0% conversion).

EXAMPLE V

The procedure of Example I was repeated, using a 6 oz glass bottle with the same suspension recipe, with 20 g vinyl chloride, 0.024 g (0.138 mmole) ascorbic acid and 0.067 ml (0.277 mmole) t-butyl peroxyoctoate (0.3% by weight of vinyl chloride). After 8.5 hours at 50° C., the yield was 8.1 g (40.5% conversion).

While particular embodiments of this invention have been disclosed above, it will be understood that the invention is obviously subject to variation and modification without departing from its broader aspects.

What is claimed is:

1. A process for the preparation of polymers and copolymers of vinyl chloride, which consists in suspension polymerization in the presence of a redox catalyst system consisting of t-butyl peroxyoctoate and isoascorbic acid.

* * * * *